United States Patent
Grant et al.

(10) Patent No.: US 9,948,694 B2
(45) Date of Patent: Apr. 17, 2018

(54) ADDRESSING APPLICATION PROGRAM INTERFACE FORMAT MODIFICATIONS TO ENSURE CLIENT COMPATIBILITY

(71) Applicant: INTERNATIONAL BUSINESS MACHINES CORPORATION, Armonk, NY (US)

(72) Inventors: Cristina L. Grant, Coral Gables, FL (US); Patricia Leon, Miami, FL (US); Adriana Valido, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 84 days.

(21) Appl. No.: 14/691,480

(22) Filed: Apr. 20, 2015

(65) Prior Publication Data

US 2016/0308933 A1     Oct. 20, 2016

(51) Int. Cl.
| | | |
|---|---|---|
| *H04L 29/08* | (2006.01) | |
| *G06F 17/30* | (2006.01) | |
| *H04L 29/06* | (2006.01) | |

(52) U.S. Cl.
CPC ........ *H04L 67/02* (2013.01); *G06F 17/30684* (2013.01); *G06F 17/30914* (2013.01); *H04L 67/2823* (2013.01); *H04L 67/42* (2013.01)

(58) Field of Classification Search
CPC ............... H04L 67/02; H04L 67/2823; G06F 17/30684; G06F 17/30914
(Continued)

(56) References Cited

U.S. PATENT DOCUMENTS

| | | |
|---|---|---|
| 7,890,659 B2 | 2/2011 | Pasha et al. |
| 7,934,221 B2 | 4/2011 | Parker et al. |
| | (Continued) | |

FOREIGN PATENT DOCUMENTS

WO     2011037979     3/2011

OTHER PUBLICATIONS

About Jsonary, Jsonary: The JSON Client Library, retrieved on Apr. 20, 2015. <http://www.jsonary.com/about-jsonary.html>.
(Continued)

*Primary Examiner* — Brian Whipple
*Assistant Examiner* — Hannah S Wang
(74) *Attorney, Agent, or Firm* — The Steadman Law Firm PLLC (57) ABSTRACT

An approach is described for addressing API modifications to ensure client compatibility. An associated method may include receiving, via a communications network, a web services request from a client application. The request may include requested information and request metadata in a first data format in accordance with a data contract. The method further may include transmitting the web services request to a server application and receiving from the server application a server response to the web services request. The server response may include a response to the requested information in a second data format and response metadata in the second data format. The method further may include evaluating the server response by completing a comparison of the request metadata in the first data format with the response metadata in the second data format and generating a client-compatible response to the web services request based upon the comparison.

14 Claims, 5 Drawing Sheets

(58) Field of Classification Search
USPC .......................................................... 709/203
See application file for complete search history.

(56) References Cited

U.S. PATENT DOCUMENTS

| | | | |
|---|---|---|---|
| 8,005,879 B2 * | 8/2011 | Bornhoevd | G06F 8/60 |
| | | | 707/899 |
| 8,209,407 B2 | 6/2012 | Warner et al. | |
| 8,458,204 B2 | 6/2013 | Wu et al. | |
| 8,793,339 B2 | 7/2014 | Macken et al. | |
| 9,300,669 B2 | 3/2016 | Fausak et al. | |
| 2008/0281820 A1 * | 11/2008 | Do | G06F 17/303 |
| 2009/0158302 A1 | 6/2009 | Nicodemus et al. | |
| 2010/0057722 A1 * | 3/2010 | Nakamura | G06F 17/30274 |
| | | | 707/E17.03 |
| 2010/0057834 A1 * | 3/2010 | Macken | G06F 9/543 |
| | | | 709/203 |
| 2011/0161465 A1 | 6/2011 | Kowalski | |
| 2012/0011174 A1 * | 1/2012 | Dham | H04N 21/23106 |
| | | | 707/813 |
| 2013/0125147 A1 | 5/2013 | Ahmed et al. | |
| 2014/0280494 A1 | 9/2014 | Samoylenko et al. | |
| 2014/0344340 A1 * | 11/2014 | Tang | H04L 67/2823 |
| | | | 709/203 |

OTHER PUBLICATIONS

Class Diff, org.custommonkey.xmlunit, retrieved on Apr. 20, 2015. <http://xmlunit.sourceforge.net/api/org/custommonkey/xmlunit/Diff.html>.

* cited by examiner

GET /api/person/AlphaID ◄— 410 format1 { employeeName: "Beta", employeeAge: "31" } ◄— 415

FIG. 4A format2 { name: "Alpha", age: "29" } ◄— 420 format2 { name: "Beta", age: "31" } ◄— 425

FIG. 4B format1 { employeeName: "Alpha", employeeAge: "29" } ◄— 430

FIG. 4C employeeName=Beta     ← 510₁ employeeAge=31        ← 510₂ name=Beta             ← 520₁ age=31                ← 520₂

FIG. 5A employeeName ↔ name   ← 530₁ employeeAge ↔ age     ← 530₂

ADDRESSING APPLICATION PROGRAM INTERFACE FORMAT MODIFICATIONS TO ENSURE CLIENT COMPATIBILITY

BACKGROUND

The various embodiments described herein generally relate to application program interface (API) modifications. More specifically, the various embodiments describe techniques for addressing API modifications to ensure client compatibility.

Client applications often submit web service requests to hosted online applications. Since many online applications are constantly upgraded to add new functionality or to upgrade existing functionality, such online applications may modify API formats used for purposes of communicating with clients or other applications. Accordingly, a client application may receive from an online application a response to a web service request that does not comply with the response format expected by the client application. Accordingly, the client application may have difficulty interpreting the response received or may be unable to interpret the response. Therefore, the ability of the client to obtain web services may be reduced simply due to modifications in API format. Consequently, a user associated with the client application may be unable to appropriately interface with online applications.

SUMMARY

The various embodiments of the invention provide techniques for addressing modifications to application program interface (API) format to ensure client compatibility. An associated method may include receiving, via a communications network, a web services request from a client application. In an embodiment, the client application may be a browser application running in a memory of a computing system. The web services request may include requested information and request metadata in a first data format in accordance with a data contract. The method further may include transmitting the web services request to a server application and receiving from the server application a server response to the web services request. The server response may include a response to the requested information in a second data format and response metadata in the second data format. The method further may include evaluating the server response by completing a comparison of the request metadata in the first data format with the response metadata in the second data format. The method further may include generating a client-compatible response to the web services request based upon the comparison. Specifically, the client-compatible response may include a response to the requested information in the first data format in accordance with the data contract. The method further may include transmitting the client-compatible response to the client application.

In an embodiment, the second data format may be an updated version of the first data format. In a further embodiment, completing the comparison according to the method may include generating respective attribute-value pairs from the request metadata in the first data format and respective attribute-value pairs from the response metadata in the second data format and comparing the respective attribute-value pairs from the request metadata in the first data format with the respective attribute-value pairs from the response metadata in the second data format. According to such embodiment, completing the comparison further may include creating mapping relationships between respective attributes from the request metadata in the first data format and corresponding respective attributes from the response metadata in the second data format. The mapping relationships between the respective attributes from the metadata in the first data format and the corresponding respective attributes from the metadata in the second data format may be created via textual analysis.

In a further embodiment, the request metadata in the first data format may be sample data in the first data format. According to such embodiment, the response metadata in the second data format may be sample data in the second data format.

In a further embodiment, the method step of transmitting the request to the server application may include transmitting a plurality of sub-requests, one of the plurality of sub-requests including the requested information and another of the plurality of sub-requests including the request metadata in the first data format. Furthermore, the method step of receiving from the server application the server response to the request may include receiving a plurality of server sub-responses, one of the plurality of server sub-responses including the response to the requested information in the second data format and another of the plurality of server sub-responses including the response metadata in the second data format.

In a further embodiment, the metadata in the first format may be included in a header of one or more data packets associated with the request. Additionally, the metadata in the second format may be included in a header of one or more data packets associated with the server response.

An additional embodiment includes a computer program product including a computer readable storage medium having program instructions embodied therewith, wherein the program instructions may be executable by a computing device to cause the computing device to perform one or more steps of above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

The various embodiments described herein are directed to techniques for addressing application program interface (API) format modifications to ensure that a response to a web services request is client-compatible. The various embodiments may address a scenario in which an API format associated with a server application providing one or more web services is distinct from an API format expected by a client application in accordance with a data contract. Such distinction may arise from a scenario in which the API format associated with the server application is modified following a previous response from the server application in accordance with the data contract.

The various embodiments described herein may have advantages over conventional techniques of addressing API format modifications. Specifically, the various embodiments may ensure client compatibility with applications providing third party web services, even following API modifications made to such applications. Client compatibility with respective API formats used by online applications is necessary to ensure that web services provided by such applications are available. Furthermore, the various embodiments may permit a client application to interface with web services without the need for constant updates. Additionally, the various embodiments may provide a tool for efficiently detecting format mismatches during client/server interactions. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client device, server, or API adaptation system running an application according to the various embodiments described herein may be deployed to a computing cloud. Moreover, cloud-based database systems, virtual machines, and a variety of other server applications may be used to manage such workloads.

Further, particular embodiments describe techniques for addressing API modifications to ensure client compatibility. However, it should be understood that the techniques described herein may be adapted to a variety of purposes in addition to those specifically described herein. Accordingly, references to specific embodiments are included to be illustrative and not limiting.

Figure 1:
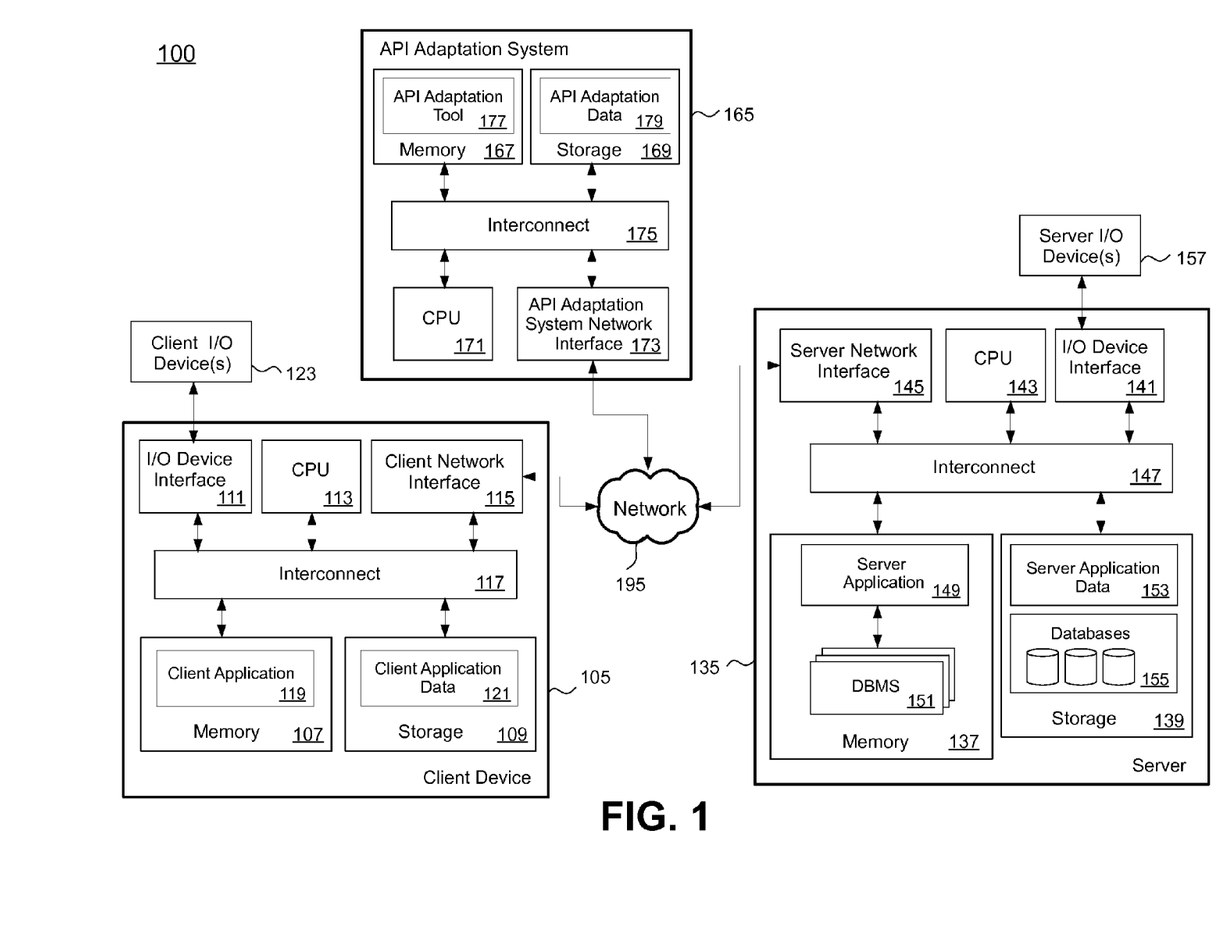
FIG. 1 illustrates a computing infrastructure, according to an embodiment.

FIG. 1 illustrates a computing infrastructure 100, according to an embodiment. As shown, computing infrastructure 100 includes a client device 105, server 135, and API adaptation system 165, each connected to a communications network 195. Computing infrastructure 100 is an example and is not intended to be limiting.

Illustratively, client device 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client device 105 is included to be representative of a single client or multiple clients. In an embodiment, client device 105 may be a thin client. In a further embodiment, client device 105 may be a mobile device (e.g., a cellular telephone or a tablet device). Memory 107 may include a client application 119. Client application 119 may be an online application configured for interfacing with server 135, API adaptation system 165, and other computing systems. Storage 109 may include client application data 121 associated with client application 119. I/O device interface 111 may be communicatively coupled to one or more client I/O devices 123. CPU 113 is included to be representative of a single CPU, multiple CPUs, a single CPU having multiple processing cores, and the like. Client network interface 115 may receive data from and transmit data to server 135 or API adaptation system 165 via network 195.

Server 135 may include a memory 137, storage 139, I/O device interface 141, a CPU 143, and a server network interface 145, all of which may be interconnected via interconnect 147 (e.g., a bus). Although shown as a single computing system, server 135 is included to be representative of a single server system or multiple server systems. Memory 137 may include a server application 149. Server application 149 may interface with at least one of a database management system, a discussion forum, a social network, a product marketplace, or a weblog. As illustrated in FIG. 1, server application 149 interfaces with a database management system (DBMS) 151, which also is included in memory 137. DBMS 151 is included be representative of a single database system or multiple database systems. Storage 139 may include server application data 153 and databases 155. Server application 149 may generate and process server application data 153 based on interaction with client device 105 or API adaptation system 165. Server application 149 may send database requests to DBMS 151, and server application 149 may process results returned by DBMS 151 to generate server application data 153. DBMS 151 may include a software application configured to manage databases 155. Databases 155 may include one or more relational databases. Additionally, databases 155 may include one or more ontology trees or other ontological structures. While FIG. 1 illustrates three databases 155, computing infrastructure 100 may include any number of databases. According to an embodiment, DBMS 151 may send requests to remote databases (not shown) via network 195.

I/O device interface 141 may be communicatively coupled to one or more server I/O devices 157. CPU 143 is included to be representative of a single CPU, multiple CPUs, a single CPU having multiple processing cores, and the like. Server network interface 145 may receive data from and transmit data to client computing system 105 via network 195. Specifically, server application 149 may accept requests sent by client device 105 or API adaptation system 165 to server 135 and may transmit data to client device 105 or API adaptation system 165 via server network interface 145.

Furthermore, API adaptation system 165 may include a memory 167, storage 169, a central processing unit (CPU) 171, and an API adaptation system network interface 173, all of which may be interconnected via interconnect 175 (e.g., a bus). Although shown as a single system, API adaptation system 165 is included to be representative of a single system or multiple systems. In an embodiment, API adaptation system 165 is included to be representative of a computing device or multiple computing devices.

Memory 167 of API adaptation system 165 may include an API adaptation tool 177, which may be an application for carrying out one or more of the techniques as described herein. API adaptation tool 177 may be an online application configured for interfacing with client device 105, server 135, and other computing systems. Storage 169 may include API adaptation data 179 associated with API adaptation tool 177. CPU 171 is included to be representative of a single CPU, multiple CPUs, a single CPU having multiple processing cores, and the like. API adaptation system network interface 173 may receive data from and transmit data to client device 105 or server 135 via network 195.

Although API adaptation system 165 is shown as a separate component in computing infrastructure 100, according to an embodiment some or all of the components or functionality of API adaptation system 165 may be incorporated into server 135 or into another computing system. According to a further embodiment, the functionality of API adaptation system 165 may be incorporated into client application 119. For instance, according to such embodiment, client application 119 may be a browser application having a capability to adapt a response from server application 149 into a client-compatible response.

Figure 2:
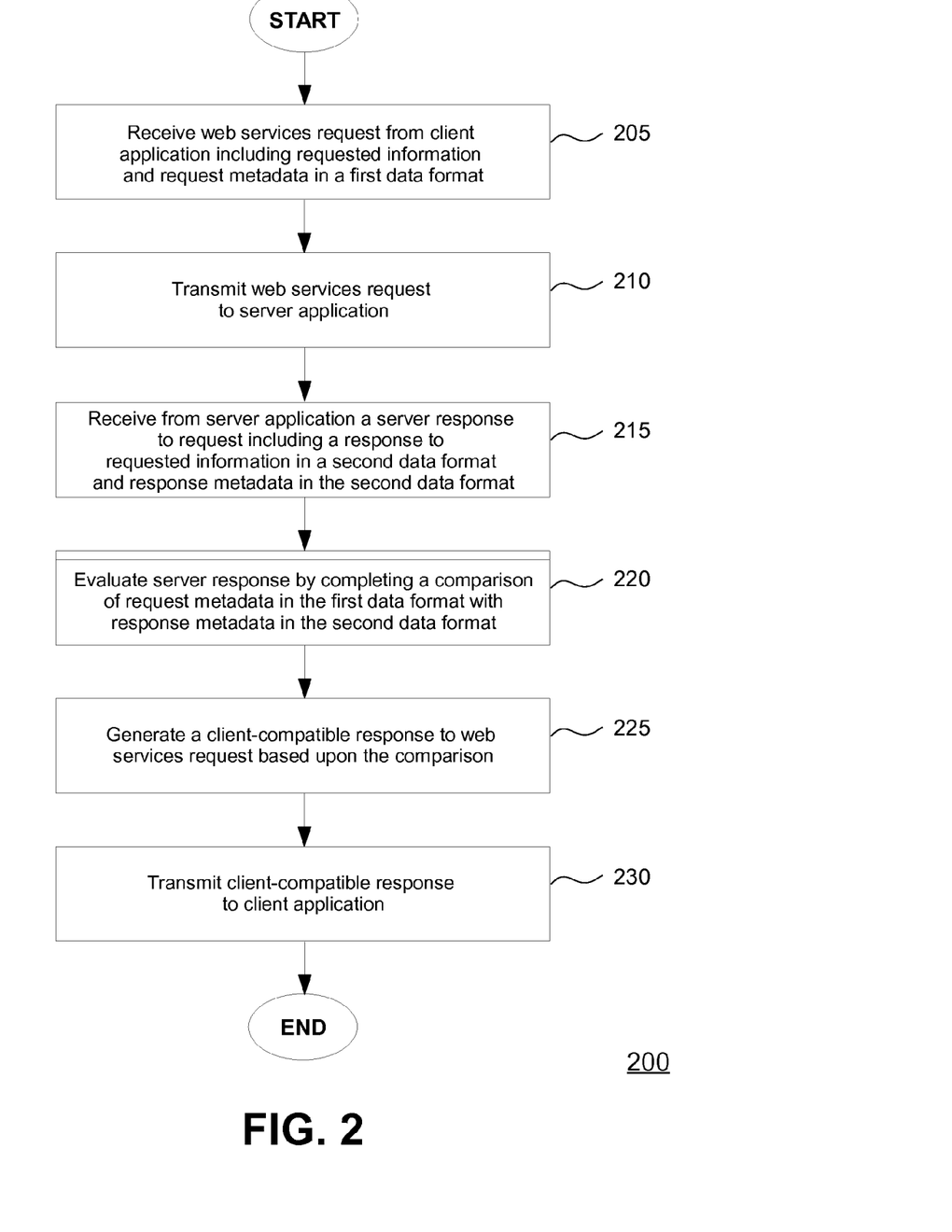
FIG. 2 illustrates a method of addressing application program interface (API) modifications, according to an embodiment.

FIG. 2 illustrates a method 200 of addressing application program interface modifications, according to an embodiment. According to the method 200, an API adaptation tool (e.g., API adaptation tool 177 of API adaptation system 165) may adapt a response of a server application (e.g., server application 149 of server 135) to a request of a client application (e.g., client application 119 of client device 105) in order to generate a client-compatible response. The client application request may be for one or more web services. The server application may be a hosted online application designed to accommodate client web services requests. For instance, the client application request may be associated with a social network, an electronic mail message, a user comment associated with a weblog posting, a product review submission, a marketing survey submission, or any other resource associated with an online application.

The method 200 may begin at step 205, where the API adaptation tool may receive, via a communications network (e.g., network 195), a web services request from the client application. The web services request may include information requested by the client from the server application. The web services request also may include request metadata in a first data format in accordance with a data contract. The first data format may be a format associated with an API. According to an embodiment, the data contract may reflect a response format expected by the client application. According to such embodiment, the data contract may be based upon previous interaction with the server application. At step 210, the API adaptation tool may transmit the web services request to the server application, e.g., via the communications network.

At step 215, the API adaptation tool may receive from the server application a server response to the web services request from the client application. The server response may include a response to the requested information in a second data format. The second data format may be a format associated with an API. Furthermore, according to an embodiment, the second data format may be an updated version of the first data format. In such embodiment, the second data format may arise as a result of one or more modifications to the API associated with the server application. The server response also may include response metadata in the second data format. At step 220, the API adaptation tool may evaluate the server response by completing a comparison of the request metadata in the first data format with the response metadata in the second data format. An embodiment pertaining to completing the comparison according to step 220 is described further herein with respect to the method 300. In an embodiment, the API adaptation tool may provide a report highlighting distinctions between the first data format and the second data format found as a result of the comparison. Such report may be provided directly to the client application and/or the server application, or alternatively such report may be placed in the public domain.

At step 225, the API adaptation tool may generate a client-compatible response to the web services request based upon the comparison completed at step 220. Specifically, the client-compatible response may include a response to the requested information in the first data format in accordance with the data contract. At step 230, the API adaptation tool may transmit the client-compatible response to the client application.

According to a further embodiment, the request metadata in the first data format in the request may be sample data in the first data format, and the response metadata in the second data format in the server response may be sample data in the second data format. For instance, the sample data in the first format may include information previously obtained by the client application from the server application in accordance with the data contract (e.g., information with respect to the identity of an individual, including name, age, etc.).

According to a further embodiment, the request metadata in the first format may be included in a header of one or more data packets associated with the request from the client application. Additionally, the response metadata in the second format may be included in a header of one or more data packets associated with the server response to the web services request.

According to an embodiment, at step 210 the API adaptation tool may transmit the request to the server application by transmitting a plurality of sub-requests. One of the plurality of sub-requests may include the information requested by the client, and another of the plurality of sub-requests may include the request metadata in the first data format. The API adaptation tool may transmit each of the plurality of sub-requests separately to the server application. Furthermore, according to such embodiment, at step 215 the API adaptation tool may receive from the server application a server response to the request by receiving a plurality of server sub-responses. One of the plurality of server sub-responses may include the response to the information requested by the client in the second data format, and another of the plurality of server sub-responses may include the response metadata in the second data format. The API adaptation tool may receive each of the plurality of sub-responses separately from the server application. According to such embodiment, the server application need not be aware of any packet headers or other formatting considerations with respect to the request metadata; rather, the server application may simply address the request metadata as if it were a request for information.

Figure 3:
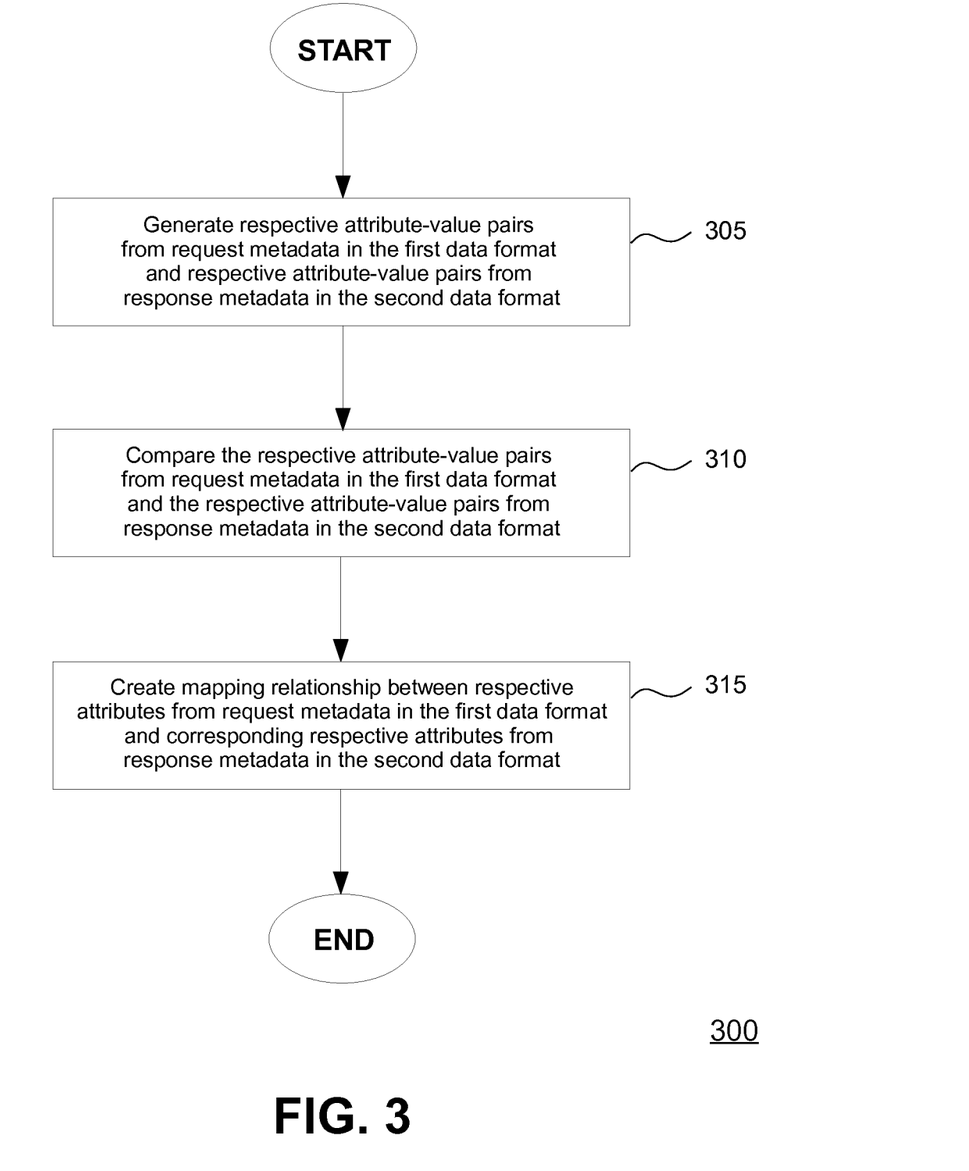
FIG. 3 illustrates a method of evaluating a server response to a web services request via a comparison, according to an embodiment.

FIG. 3 illustrates a method 300 of evaluating the server response by completing a comparison of the request metadata in the first data format with the response metadata in the second data format. The method 300 provides an example embodiment with respect to step 220 of the method 200. The method 300 may begin at step 305, where the API adaptation tool may generate respective attribute-value pairs from the request metadata in the first data format and respective attribute-value pairs from the response metadata in the second data format. The generated attribute-value pairs provide respective normalized versions of the request metadata in the first data format and the response metadata in the second data format, from which the API adaptation tool may determine structural differences between the two data formats. At step 310, the API adaptation tool may compare the respective attribute-value pairs from the request metadata in the first data format with the respective attribute-value pairs from the response metadata in the second data format.

At step 315, based upon the attribute-value pair comparison, the API adaptation tool may create mapping relationships between respective attributes from the request metadata in the first data format and corresponding respective attributes from the response metadata in the second data format. In an embodiment, the API adaptation tool may create the mapping relationships at step 315 via textual analysis. According to such textual analysis, the API adaptation tool may determine analogous attributes among the data formats and viable mappings between the first data format and the second data format based on the determined analogous attributes. While this embodiment involves a comparison of two data formats, the same process may be used to compare more than two data formats.

Figure 4A:
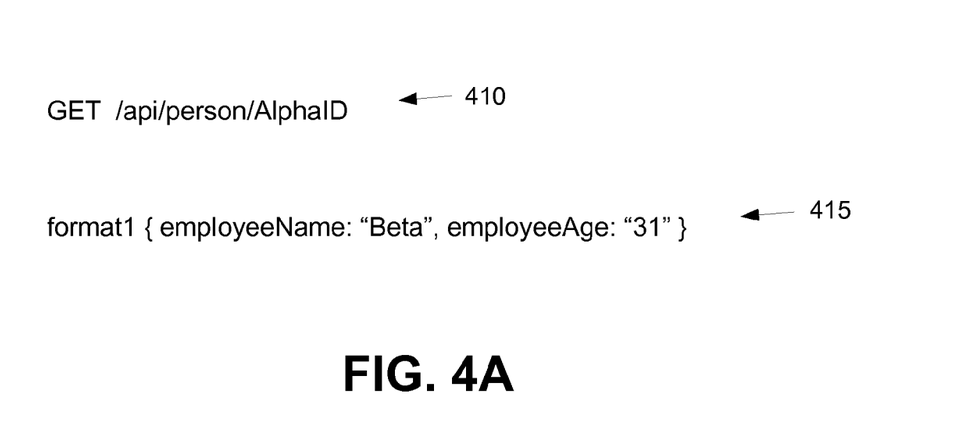
FIGS. 4A, 4B, and 4C illustrate an example scenario of addressing API modifications, according to an embodiment.
Figure 4B:
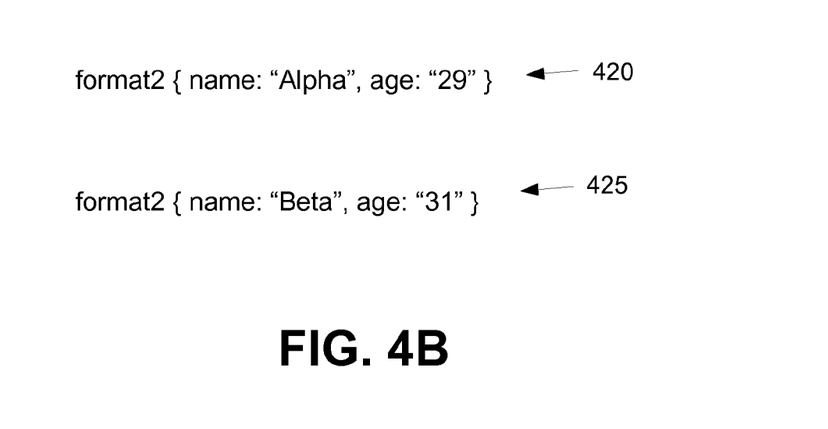
Figure 4C:
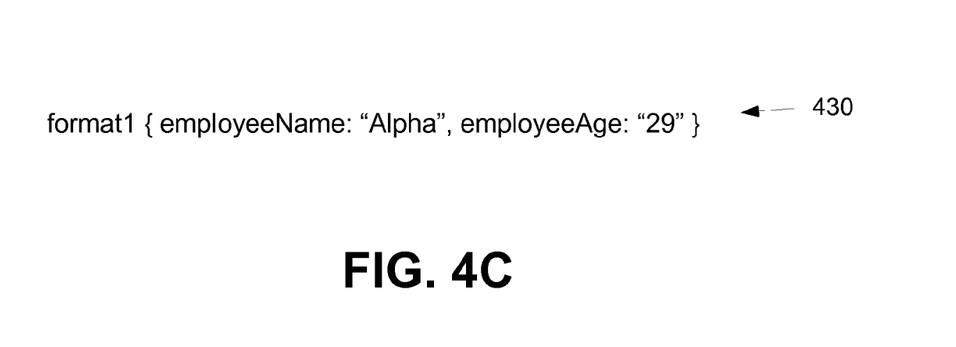

FIGS. 4A, 4B, and 4C illustrate an example scenario of addressing API modifications according to the method 200. According to step 205 of the method 200, the API adaptation tool may receive a web services request from the client application. As illustrated in FIG. 4A, the web services request may include requested information 410, to be requested from the server application. Specifically, requested information 410 may include a GET request for purposes of obtaining information of an individual named Alpha. As shown, the GET request in requested information 410 specifies an identification number or character string ("AlphaID"). The request also may include request metadata 415 in the form of sample data in a first data format ("format1") in accordance with a data contract. Specifically, request metadata 415 includes sample data associated with an individual named Beta in the first data format. The data contract indicates an expectation that the client application receive a response to requested information 410 from the server application in the first data format. According to step 210, the API adaptation tool may transmit the request to the server application.

According to step 215, the API adaptation tool may receive from the server application a server response to the request from the client application. As illustrated in FIG. 4B, the server response may include a response to the requested information 420 in a second data format ("format2"). The server response also may include response metadata 425 in the second data format. Specifically, metadata 425 includes sample data associated with Beta in the second data format.

According to step 220, the API adaptation tool may evaluate the server response by completing a comparison of the metadata 415 in the first data format with the response metadata 425 in the second data format. According to step 225, the API adaptation tool may generate a client-compatible response to the request based upon the comparison completed according to step 220. As illustrated in FIG. 4C, the client-compatible response includes a response to the requested information 430 in the first data format in accordance with the data contract. According to step 230, the API adaptation tool may transmit the client-compatible response, including the response to the requested information 430 in the first data format, to the client application.

Figure 5A:
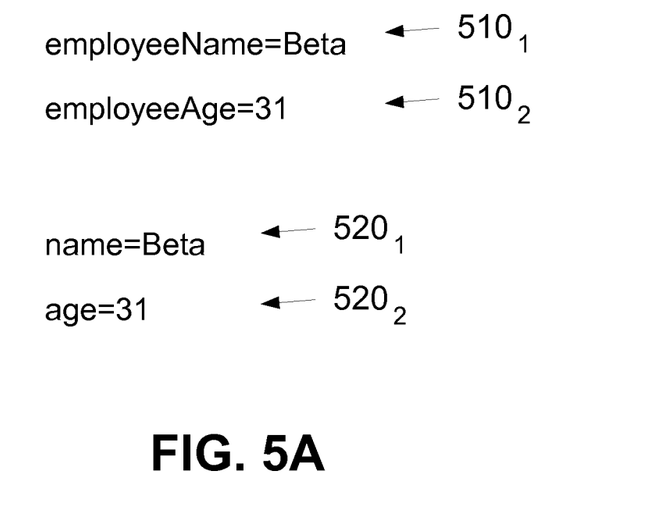
FIGS. 5A and 5B illustrate the example scenario of FIGS. 4A, 4B, and 4C in the context of completing a metadata comparison, according to an embodiment.
Figure 5B:
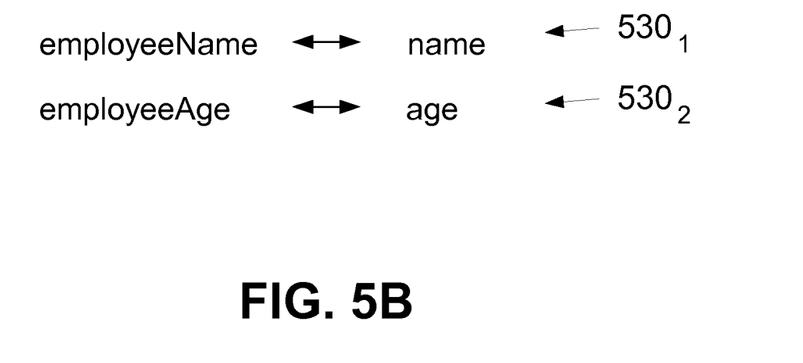

FIGS. 5A and 5B illustrate the example scenario in the context of completing a comparison according to the method 300. According to step 305, the API adaptation tool may generate respective attribute-value pairs $510_1$ and $510_2$ from the request metadata 415 in the first data format and respective attribute-value pairs $520_1$ and $520_2$ from the response metadata 425 in the second data format, as illustrated in FIG. 5A. According to step 310, the API adaptation tool may compare the respective attribute-value pairs $510_1$ and $510_2$ from the request metadata 415 in the first data format with the respective attribute-value pairs $520_1$ and $520_2$ from the response metadata 425 in the second data format.

According to step 315, based upon the attribute-value pair comparison, the API adaptation tool may create mapping relationships between respective attributes from the request metadata 415 in the first data format and corresponding respective attributes from the response metadata 425 in the second data format. As illustrated in FIG. 5B, the API adaptation tool may create a mapping relationship $530_1$ between the "employeeName" and "name" attributes based upon the comparison of attribute-value pairs $510_1$ and $520_1$. Similarly, the API adaptation tool may create a mapping relationship $530_2$ between the "employeeAge" and "age" attributes based upon the comparison of attribute-value pairs $510_2$ and $520_2$. The API adaptation tool may create mapping relationships $530_1$ and $530_2$ based upon textual analysis. For instance, the API adaptation tool may determine that "employeeName" and "name" include common characters and accordingly may determine that these attributes are analogous. Based upon such determination, mapping relationship $530_1$ may be created. Similarly, the API adaptation tool may determine that "employeeAge" and "age" include common characters and accordingly may determine that these attributes are analogous. Based upon such determination, mapping relationship $530_2$ may be created. Accordingly, based upon the comparison completed according to the method 300, the API adaptation tool may use mapping relationships $530_1$ and $530_2$ to generate the client-compatible response that includes the response to the requested information 430 in the first data format, as illustrated in FIG. 4C.

According to the various embodiments described herein, client compatibility may be ensured following API format modifications. Specifically, according to one or more of the various embodiments, the API modification tool described according to the various embodiments may address distinctions with respect to data format that may arise in the context of responses to web services requests.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method comprising:
　receiving, by an application program interface adaptation tool via a communications network, a web services request from a client application, wherein the web services request includes requested information and request metadata in the form of sample data in a first data format in accordance with a data contract;
　transmitting, by the application program interface adaptation tool, the web services request to a server application by separately transmitting a plurality of sub-requests, wherein one of the plurality of sub-requests includes the requested information and another of the plurality of sub-requests includes the request metadata in the first data format;
　receiving, by the application program interface adaptation tool from the server application, a server response to the web services request by separately receiving a plurality of server sub-responses, wherein one of the plurality of server sub-responses includes a response to the requested information in a second data format and another of the plurality of server sub-responses includes response metadata in the form of sample data in the second data format;
　evaluating, by the application program interface adaptation tool, the server response by completing a comparison of the request metadata in the first data format with the response metadata in the second data format, wherein completing the comparison comprises:
　　generating respective attribute-value pairs from the request metadata in the first data format and respective attribute-value pairs from the response metadata in the second data format,
　　comparing the respective attribute-value pairs from the request metadata in the first data format with the respective attribute-value pairs from the response metadata in the second data format, and
　　creating mapping relationships between respective attributes from the request metadata in the first data format and corresponding respective attributes from the response metadata in the second data format; and
　generating, by the application program interface adaptation tool, a client-compatible response to the web services request based upon the comparison, the client-compatible response including a response to the requested information in the first data format in accordance with the data contract.

2. The method of claim 1, wherein the second data format is an updated version of the first data format.

3. The method of claim 1, further comprising:
　transmitting the client-compatible response to the client application.

4. The method of claim 1, wherein at least one mapping relationship among the mapping relationships is created based upon determining that a respective attribute from the request metadata in the first data format and a respective attribute from the response metadata in the second data format include common characters.

5. The method of claim 1, wherein the metadata in the first format is included in a header of one or more data packets associated with the web services request, and wherein the metadata in the second format is included in a header of one or more data packets associated with the server response.

6. The method of claim 1, wherein the client application is a browser application running in a memory of a computing system.

7. A computer program product comprising a computer readable storage medium having program instructions embodied therewith, the program instructions executable by a computing device to cause the computing device to:
　receive, by an application program interface adaptation tool via a communications network, a web services request from a client application, wherein the web services request includes requested information and request metadata in the form of sample data in a first data format in accordance with a data contract;
　transmit, by the application program interface adaptation tool, the web services request to a server application by separately transmitting a plurality of sub-requests, wherein one of the plurality of sub-requests includes the requested information and another of the plurality of sub-requests includes the request metadata in the first data format;
　receive, by the application program interface adaptation tool from the server application, a server response to the web services request by separately receiving a plurality of server sub-responses, wherein one of the plurality of server sub-responses includes a response to the requested information in a second data format and another of the plurality of server sub-responses includes response metadata in the form of sample data in the second data format;
　evaluate, by the application program interface adaptation tool, the server response by completing a comparison of the request metadata in the first data format with the response metadata in the second data format, wherein completing the comparison comprises:
　　generating respective attribute-value pairs from the request metadata in the first data format and respective attribute-value pairs from the response metadata in the second data format,
　　comparing the respective attribute-value pairs from the request metadata in the first data format with the respective attribute-value pairs from the response metadata in the second data format, and
　　creating mapping relationships between respective attributes from the request metadata in the first data format and corresponding respective attributes from the response metadata in the second data format; and
　generate, by the application program interface adaptation tool, a client-compatible response to the web services request based upon the comparison, the client-compatible response including a response to the requested information in the first data format in accordance with the data contract.

8. The computer program product of claim 7, wherein the second data format is an updated version of the first data format.

9. The computer program product of claim 7, wherein completing the comparison comprises the program instructions further cause the computing device to:
　transmit the client-compatible response to the client application.

10. The computer program product of claim 7, wherein at least one mapping relationship among the mapping relationships is created based upon determining that a respective attribute from the request metadata in the first data format and a respective attribute from the response metadata in the second data format include common characters.

11. A system comprising:
   a processor; and
   a memory storing an application program, which, when executed on the processor, performs an operation comprising:
      receiving, by an application program interface adaptation tool via a communications network, a web services request from a client application, wherein the web services request includes requested information and request metadata in the form of sample data in a first data format in accordance with a data contract;
      transmitting, by the application program interface adaptation tool, the web services request to a server application by separately transmitting a plurality of sub-requests, wherein one of the plurality of sub-requests includes the requested information and another of the plurality of sub-requests includes the request metadata in the first data format;
      receiving, by the application program interface adaptation tool from the server application, a server response to the web services request by separately receiving a plurality of server sub-responses, wherein one of the plurality of server sub-responses includes a response to the requested information in a second data format and another of the plurality of server sub-responses includes response metadata in the form of sample data in the second data format;
      evaluating, by the application program interface adaptation tool, the server response by completing a comparison of the request metadata in the first data format with the response metadata in the second data format, wherein completing the comparison comprises:
         generating respective attribute-value pairs from the request metadata in the first data format and respective attribute-value pairs from the response metadata in the second data format,
         comparing the respective attribute-value pairs from the request metadata in the first data format with the respective attribute-value pairs from the response metadata in the second data format, and
         creating mapping relationships between respective attributes from the request metadata in the first data format and corresponding respective attributes from the response metadata in the second data format; and
      generating, by the application program interface adaptation tool, a client-compatible response to the web services request based upon the comparison, the client-compatible response including a response to the requested information in the first data format in accordance with the data contract.

12. The system of claim 11, wherein the second data format is an updated version of the first data format.

13. The system of claim 11, wherein the operation further comprises:
   transmitting the client-compatible response to the client application.

14. The system of claim 11, wherein at least one mapping relationship among the mapping relationships is created based upon determining that a respective attribute from the request metadata in the first data format and a respective attribute from the response metadata in the second data format include common characters.

* * * * *